US012025728B2

(12) United States Patent
Lee et al.

(10) Patent No.: US 12,025,728 B2
(45) Date of Patent: Jul. 2, 2024

(54) RADAR APPARATUS AND METHOD FOR DETECTING OBJECT BASED ON MULTIPLE MODES

(71) Applicant: BITSENSING INC., Seoul (KR)

(72) Inventors: Jae Eun Lee, Seoul (KR); Hae Seung Lim, Seongnam-si (KR)

(73) Assignee: BITSENSING INC., Seoul (KR)

( * ) Notice: Subject to any disclaimer, the term of this patent is extended or adjusted under 35 U.S.C. 154(b) by 657 days.

(21) Appl. No.: 17/139,172

(22) Filed: Dec. 31, 2020

(65) Prior Publication Data
US 2022/0206108 A1 Jun. 30, 2022

(30) Foreign Application Priority Data
Dec. 28, 2020 (KR) .................. 10-2020-0184897

(51) Int. Cl.
*G01S 7/35* (2006.01)
*G01S 7/41* (2006.01)
*G01S 13/931* (2020.01)

(52) U.S. Cl.
CPC ........ *G01S 7/35* (2013.01); *G01S 7/41* (2013.01); *G01S 7/417* (2013.01); *G01S 13/931* (2013.01); *G01S 2013/93271* (2020.01)

(58) Field of Classification Search
CPC ......... G01S 13/931; G01S 2013/93271; G01S 13/343; G01S 13/865; G01S 13/42; G01S 13/584; G01S 15/931; G01S 13/87; G01S 2013/0254; G01S 2013/93272; G01S 2013/93274; G01S 2013/93275; G01S 17/931; G01S 13/345; G01S 7/032; G01S 7/35; G01S 7/41; G01S 7/417; G01S 7/02; H01Q 1/3233; B60W 2420/52; G06V 20/58; G06V 10/764
See application file for complete search history.

(56) References Cited

U.S. PATENT DOCUMENTS

| | | | |
|---|---|---|---|
| 8,405,541 B2* | 3/2013 | Lee | G01S 13/0209 342/128 |
| 8,902,103 B2* | 12/2014 | Kim | G01S 13/345 342/134 |
| 10,220,850 B2* | 3/2019 | Naserian | F02D 41/042 |
| 10,775,483 B1* | 9/2020 | Kim | G01S 13/584 |

(Continued)

FOREIGN PATENT DOCUMENTS

| | | |
|---|---|---|
| KR | 100951529 B1 | 4/2010 |
| KR | 1020110080469 A | 7/2011 |

(Continued)

*Primary Examiner* — Olumide Ajibade Akonai
(74) *Attorney, Agent, or Firm* — Dinsmore & Shohl LLP; Yongsok Choi, Esq.

(57) ABSTRACT

An object detection radar apparatus is installed in a vehicle and is configured to detect an object. The object detection radar apparatus includes a transceiver configured to: transmit a radar signal to the outside of the vehicle based on a first mode or a second mode different from each other in terms of detection range, and receive a radar signal reflected from the object; and a processing unit configured to: detect the object based on the reflected radar signal when the first mode is activated, and recognize the object based on the reflected radar signal when the second mode is activated.

19 Claims, 6 Drawing Sheets

(56) References Cited

U.S. PATENT DOCUMENTS

| | | | | |
|---|---|---|---|---|
| 2018/0321368 A1* | 11/2018 | Bharadwaj | ............... | G01S 13/42 |
| 2019/0079177 A1* | 3/2019 | Lee | ...................... | G01S 13/48 |
| 2019/0094350 A1* | 3/2019 | Baheti | ..................... | G01S 7/415 |
| 2019/0212438 A1* | 7/2019 | Kim | ........................ | G06V 20/58 |
| 2019/0324136 A1* | 10/2019 | Amadjikpe | ............. | G01S 13/70 |
| 2019/0361114 A1* | 11/2019 | Kim | ........................ | G01S 13/42 |
| 2020/0202168 A1* | 6/2020 | Mao | ........................ | G01S 7/417 |
| 2020/0393552 A1* | 12/2020 | Fang | ...................... | G01S 7/003 |
| 2021/0296783 A1* | 9/2021 | Rostomyan | .......... | H01Q 1/2283 |

FOREIGN PATENT DOCUMENTS

| | | | | |
|---|---|---|---|---|
| KR | 1020150068126 A | 6/2015 | | |
| KR | 1020170109818 A | 10/2017 | | |
| KR | 1020190095592 A | 8/2019 | | |
| WO | WO-2011106881 A1 * | 9/2011 | ............ | G01S 13/345 |

* cited by examiner

FIG. 3

| | | SECOND MODE ~301 | FIRST MODE ~300 | |
|---|---|---|---|---|
| 310 | Antenna Structure | SHORT DISTANCE ~200 | MEDIUM DISTANCE ~201 | LONG DISTANCE ~202 |
| 311 | Bandwidth (MHz) | 3GHz (1.5GHz) | 500 MHz | 200 MHz |
| 312 | Max. Range (m) | 20 (40) | 120 | 300 |
| 313 | Max. Velocity (kph) | 250 | 250 | 250 |
| 314 | FoV (deg) | ±45/±16 (SIX VERTICAL TIERS) Az/El | ±45/±16 | ±45/±16 |
| 315 | Range Resolution (m) | 0.05 (0.1) | 0.3 | 0.75 |
| 316 | Range Accuracy (m) | 0.05 | 0.1 | 0.375 |
| 317 | Velocity Resolution (Kph) | 0.4 | 0.4 | 0.4 |
| 318 | Velocity Accuracy (Kph) | 0.2 | 0.2 | 0.2 |
| 319 | Angle Resolution (deg) | Azimuth : < 2.0 deg @0deg / 2.8deg @40deg Elevation : 5.6 deg | Azimuth : < 2.0 deg @0deg / 2.8deg @40deg Elevation : 5.6 deg | Azimuth : < 2.0 deg @0deg / 2.8deg @40deg Elevation : 5.6 deg |
| 320 | Angle Accuracy (deg) | 0.5 | 0.5 | 0.5 |
| 321 | Cycle Time (ms) | 67 | 67 | 67 |

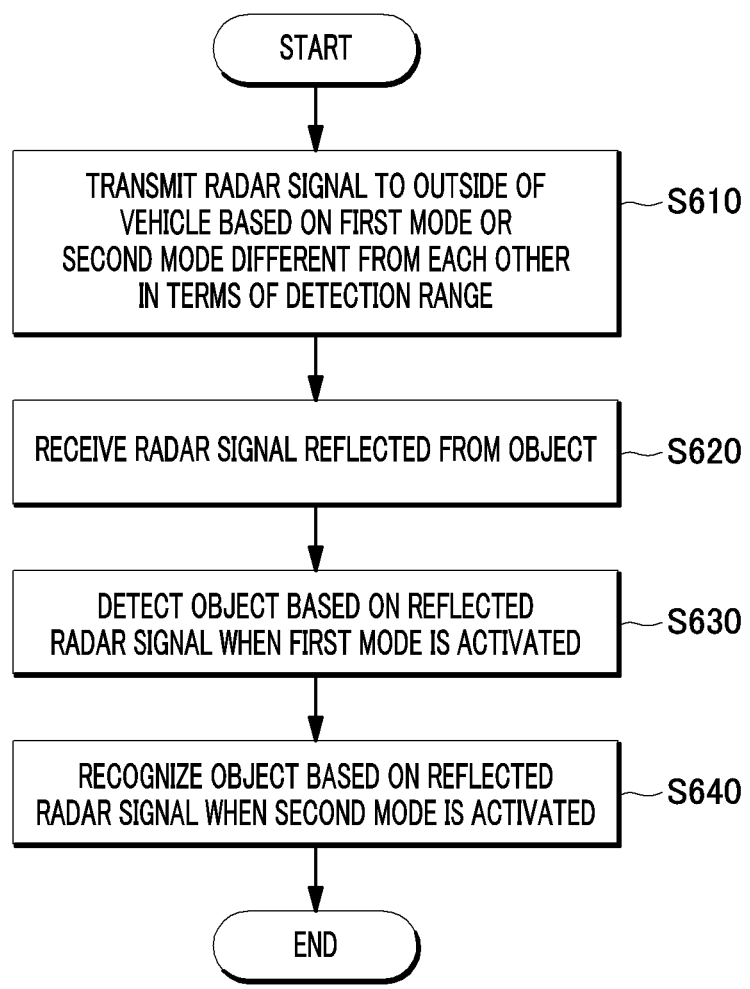

RADAR APPARATUS AND METHOD FOR DETECTING OBJECT BASED ON MULTIPLE MODES

CROSS-REFERENCE TO RELATED APPLICATION

This application claims the benefit under 35 USC 119(a) of Korean Patent Application No. 10-2020-0184897 filed on 28 Dec. 2020, in the Korean Intellectual Property Office, the entire disclosures of which are incorporated herein by reference for all purposes.

TECHNICAL FIELD

The present disclosure relates to a radar apparatus and method for detecting an object based on multiple modes.

BACKGROUND

An automotive radar functions to provide a driver with position information of nearby vehicles and obstacles present in front, beside and behind the driver's vehicle. Also, the automotive radar may be installed in an autonomous vehicle and used to control the vehicle to perform autonomous driving and support safe driving.

A conventional automotive radar has an antenna array arranged in parallel with an azimuth axis of a driving direction of the vehicle, which makes it possible to estimate the angle of an object present on the road. However, the conventional automotive radar is excellent only in angle resolution in an azimuth direction. Therefore, it has been difficult for the conventional automotive radar to identify an object.

Since autonomous vehicles have recently received a lot of attention in recent years, Lidar has been used to identify an object. However, the Lidar can be influenced by environmental factors such as weather or the like and thus cannot maintain stable performance outdoors. Accordingly, there has been a need for an automotive radar that is applicable to an autonomous vehicle, less influenced by environmental factors and able to identify an object.

SUMMARY

In view of the foregoing, the present disclosure provides an object detection radar apparatus and method capable of transmitting a radar signal to the outside of a vehicle based on a first mode or a second mode different from each other in terms of detection range and receiving a radar signal reflected from an object.

The present disclosure provides an object detection radar apparatus and method capable of detecting an object based on a reflected radar signal when a first mode is activated and recognizing an object based on a reflected radar signal when a second mode is activated.

The problems to be solved by the present disclosure are not limited to the above-described problems. There may be other problems to be solved by the present disclosure.

According to an exemplary embodiment, an object detection radar apparatus that is installed in a vehicle and configured to detect an object may include a transceiver configured to: transmit a radar signal to the outside of the vehicle based on a first mode or a second mode different from each other in terms of detection range, and receive a radar signal reflected from the object; and a processing unit configured to: detect the object based on the reflected radar signal when the first mode is activated, and recognize the object based on the reflected radar signal when the second mode is activated.

According to another exemplary embodiment, an object detection method for detecting an object by an object detection radar apparatus may include: transmitting a radar signal to the outside of a vehicle based on a first mode or a second mode different from each other in terms of detection range; receiving a radar signal reflected from the object; detecting the object based on the reflected radar signal when the first mode is activated; and recognizing the object based on the reflected radar signal when the second mode is activated.

The above-described exemplary embodiments are provided by way of illustration only and should not be construed as liming the present disclosure. Besides the above-described exemplary embodiments, there may be additional exemplary embodiments described in the accompanying drawings and the detailed description.

According to any one of the above-described embodiments of the present disclosure, it is possible to possible to provide an object detection radar apparatus and method capable of detecting an object based on a reflected radar signal when transmitting a radar signal based on a first mode corresponding to a long distance range and a medium distance range.

It is possible to possible to provide an object detection radar apparatus and method capable of detecting an object based on a reflected radar signal when transmitting a radar signal based on a second mode corresponding to a short distance range.

A conventional automotive radar is excellent only in angle resolution in an azimuth direction, and, thus, it has been difficult for the conventional automotive radar to identify an object. However, according to any one of the above-described embodiments of the present disclosure, it is possible to provide an object detection radar apparatus and method capable of identifying an object using an imaging radar having an imaging mode.

It is possible to possible to provide an object detection radar apparatus and method capable of dividing a zone outside a vehicle into a zone corresponding to a first mode and a zone corresponding to a second mode, imaging only the zone corresponding to the second mode without a need to image the entire zone outside the vehicle and thus saving computation.

It is possible to possible to provide an object detection radar apparatus and method capable of dividing a space outside a vehicle into a plurality of zones and detecting or recognizing an object by setting a detection range of a radar signal based on a first mode or a second mode.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3 is an example depiction illustrating the first mode and the second mode when the second mode is activated in accordance with an embodiment of the present disclosure.

FIG. 6 is a flowchart showing a method for detecting an object by the object detection radar apparatus in accordance with an embodiment of the present disclosure.

DETAILED DESCRIPTION

Figure 1:
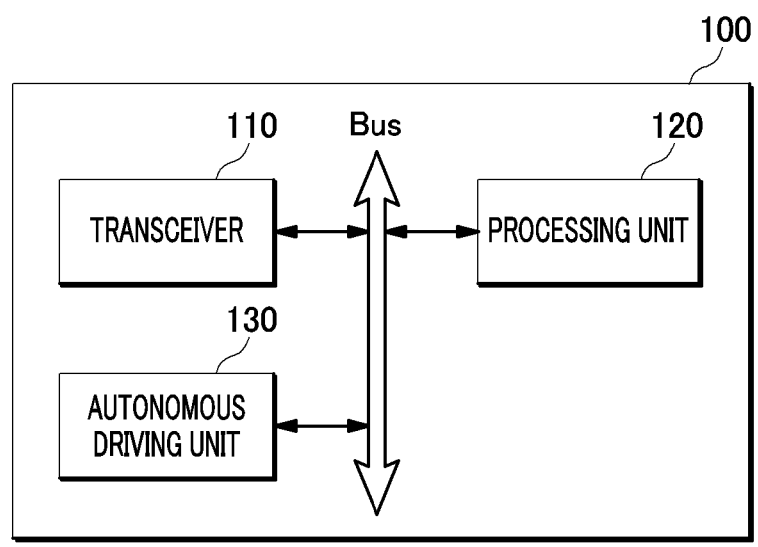
FIG. 1 is a block diagram illustrating the configuration of an object detection radar apparatus in accordance with an embodiment of the present disclosure.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

In the present specification, some of operations or functions described as being performed by a device may be performed by a server connected to the device. Likewise, some of operations or functions described as being performed by a server may be performed by a device connected to the server.

Hereinafter, the present disclosure will be explained in detail with reference to the accompanying configuration views or process flowcharts.

FIG. 1 is a block diagram illustrating the configuration of an object detection radar apparatus in accordance with an embodiment of the present disclosure. Referring to FIG. 1, an object detection radar apparatus 100 may include a transceiver 110, a processing unit 120 and an autonomous driving unit 130. Herein, the object detection radar apparatus 100 according to the present disclosure may include an imaging radar. The term "imaging radar" refers to a radar configured to transmit microwaves to an object (target), acquire reflection waves reflected and returning from the object (target) in sequence depending on the distance and acquire information about the presence and shape of the object. The imaging radar may be installed on the roof, number plate, bumper or front mirror of a vehicle.

The transceiver 110 may transmit a radar signal to the outside of a vehicle through the imaging radar under or based on a first mode or a second mode different from each other in terms of detection range. Here, the first mode may correspond to a medium and long distance range and the second mode may correspond to a short distance range shorter than the medium and long distance range. The process of transmitting the radar signal will be described in detail with reference to FIG. 2 and FIG. 3.

Figure 2:
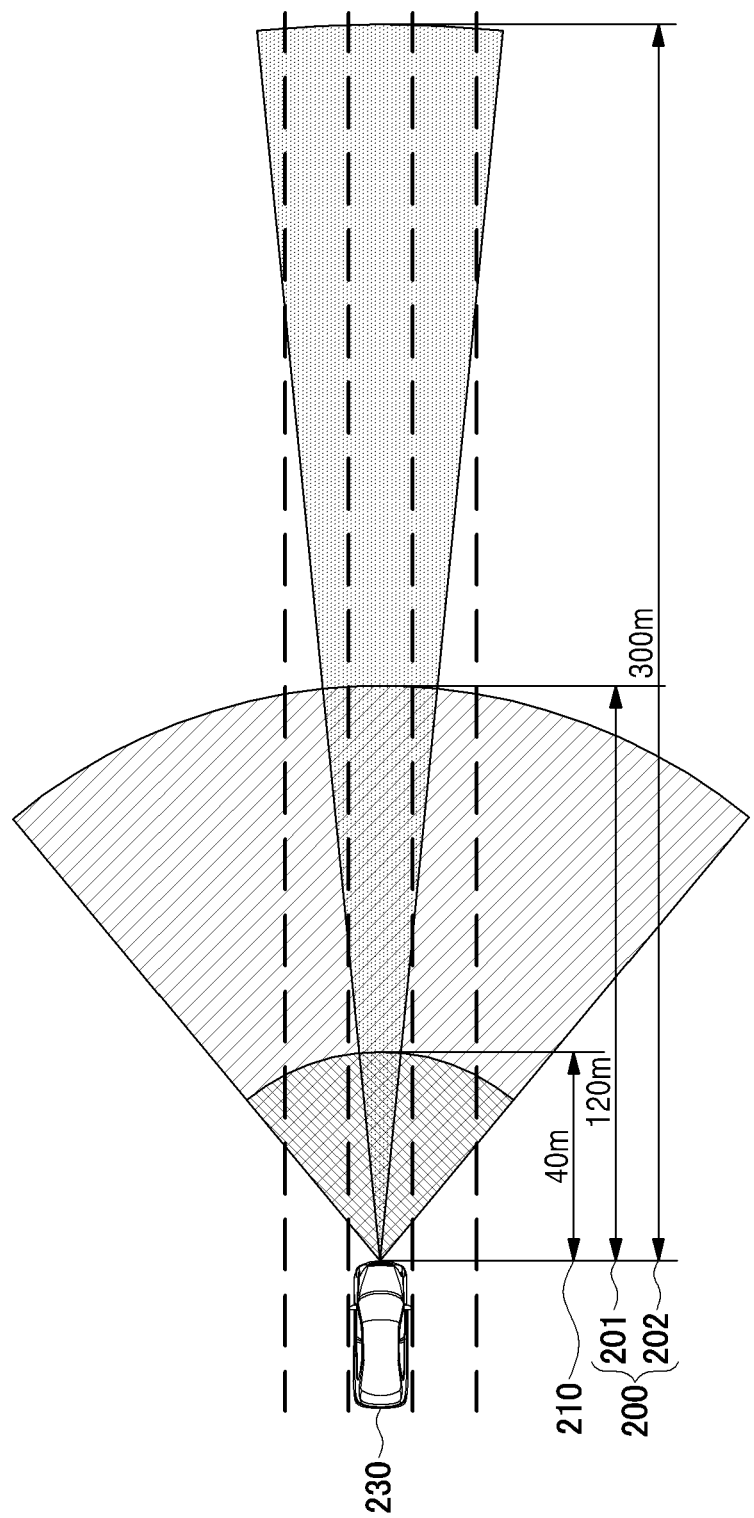
FIG. 2 is an example depiction to explain a process of transmitting a radar signal from the object detection radar apparatus under or based on a first mode or a second mode in accordance with an embodiment of the present disclosure.

FIG. 2 is an example depiction to explain the process of transmitting the radar signal from the object detection radar apparatus based on the first mode or the second mode in accordance with an embodiment of the present disclosure. For example, the first mode includes a medium distance mode and a long distance mode, and when the first mode is activated, the object detection radar apparatus 100 may perform a detection process on an object. Referring to FIG. 2, the transceiver 110 may transmit a radar signal to a medium and long distance range 200 corresponding to the first mode. For example, the transceiver 110 may transmit a radar signal to a medium distance range 201 corresponding to the medium distance mode included in the first mode so as to reach a distance of, for example, 120 meters (m) from a vehicle 230. Also, the transceiver 110 may transmit a radar signal to a long distance range 202 corresponding to the long distance mode included in the first mode so as to reach a distance of, for example, 300 m from the vehicle 230. Here, the first mode may be in an activation state even without an activation trigger from when the vehicle 230 starts driving on the road until the vehicle 230 stops driving.

The transceiver 110 may transmit a radar signal to a short distance range 210 corresponding to the second mode. For example, the second mode may include, for example, a short distance mode having a shorter detection range than the medium and long distance range 200, and when the second mode is activated, the object detection radar apparatus 100 may perform a recognition process on an object. Here, the recognition process is a more detailed process than the detection process of simply detecting the presence or absence of an object and may include a function of classifying the kind of the object. That is, the second mode may be a mode in which radar imaging for performing the recognition process on an object located in the short distance range 210 can be carried out based on a 4D point cloud acquired from radar signals. Therefore, according to the present disclosure, radar imaging is carried out for the short distance range of the second mode among the entire detection range, and, thus, computation resource required for radar imaging can be spatially saved and computation resource for identifying and recognizing an object can also be saved. The saving of computation resource may result in low price of a processor for performing the above-described series of processes.

Meanwhile, a technique for improving the performance of an analog-to-digital converter integrated in a radio-frequency integrated circuit (RFIC) requires a high level of skill. Therefore, according to the present disclosure, a space is limited to carry out radar imaging in the short distance range of the second mode among the entire detection range in consideration of limitations in performance of the analog-to-digital converter, which enables efficient radar imaging.

For example, the transceiver 110 may transmit a radar signal to the short distance range 210 corresponding to the second mode so as to reach a distance of, for example, 40 m from the vehicle 230. Here, the second mode may be activated only when a nearby vehicle or obstacle enters in the vicinity of the vehicle 230. Otherwise, like the first mode, the second mode may be in an activation state based on a user's setting even without an activation trigger.

FIG. 3 is an example depiction illustrating the first mode and the second mode when the second mode is activated in accordance with an embodiment of the present disclosure. Referring to FIG. 3, a detection range in a medium distance mode included in a first mode 300 includes the medium distance range 201, a detection range in a long distance mode included in the first mode 300 includes a long distance range 202, and a detection range in a second mode 301 may include the short distance range 210.

Hereinafter, the first mode 300 will be described.

An antenna structure 310 in the first mode 300 may include a plurality of transmitter antennas Tx arranged at regular horizontal and vertical intervals in a diagonal direction and a plurality of receiver antennas Rx arranged in parallel with each other in a horizontal direction based on an azimuth axis of a driving direction of the vehicle.

For example, a bandwidth 311 for the first mode 300 may be 500 MHz for the medium distance range 201 and 200 MHz for the long distance range 202.

For example, a max range 312 for the first mode 300 may be 120 m for the medium distance range 201 and 300 m for the long distance range 202.

For example, a max velocity 313 of an object to be detected using a radar signal in the medium and long distance ranges 201 and 202 of the first mode 300 may be 250 kilometers per hour (kph), and a field of view (FoV) 314 for the first mode 300 may be ±45/±16 deg.

For example, a range resolution 315 for the first mode 300 may be 0.3 m for the medium distance range 201 and 0.75 m for the long distance range 202.

For example, a range accuracy 316 for the first mode 300 may be 0.1 m for the medium distance range 201 and 0.375 m for the long distance range 202.

For example, the medium and long distance ranges 201 and 202 of the first mode 300 may have a velocity resolution 317 of 0.4 kph and a velocity accuracy 318 of 0.2 kph.

For example, the medium and long distance ranges 201 and 202 of the first mode 300 may have an angle resolution 319 including an azimuth angle of 2.8 deg or less and an elevation angle of 5.6 deg, an angle accuracy 320 of 0.5 deg and a cycle time of 67 milliseconds (ms).

Here, in the first mode 300 before the second mode 301 is activated, the medium distance mode and the long distance mode may be performed alternately at an interval of a first cycle time. For example, if the first cycle time is 50 ms, the medium distance mode and the long distance mode may be performed alternately at an interval of 50 ms.

Then, when the second mode 301 is activated, the first mode 300 and the second mode 301 may be performed according to a second cycle time 321 (for example, 67 ms) different from the first cycle time. The first cycle time may be shorter than the second cycle time 321. For example, when the second mode 301 is activated, three modes including the medium distance mode included in the first mode 300, the long distance mode included in the first mode 300 and the second mode 301 may be performed alternately at an interval of 67 ms which is the second cycle time 321.

Hereinafter, the second mode 301 will be described.

The antenna structure 310 in the second mode 301 may include a plurality of transmitter antennas Tx arranged at regular horizontal and vertical intervals in the diagonal direction and a plurality of receiver antennas Rx arranged in a zigzag pattern to have horizontal and vertical intervals.

Conventionally, antennas are arranged along an azimuth axis of a driving direction of a vehicle, and, thus, it is possible to detect an object only in an azimuth direction. However, according to the present disclosure, antennas are also arranged in the vertical direction, and, thus, it is possible to detect an elevation angle of the object.

For example, a bandwidth 311 for the second mode 301 may be 3 GHz (or 1.5 GHz).

For example, a max range 312 for the second mode 301 may be 20 m (or 40 m at the bandwidth of 1.5 GHz).

For example, a max velocity 313 of an object to be detected using a radar signal in the second mode 301 may be 250 kph.

For example, an FoV 314 for the second mode 301 may be ±45/±16 deg.

For example, a range resolution 315 for the second mode 301 may be 0.05 m and a range accuracy 316 of the second mode may 301 be 0.01 m.

For example, the second mode 301 may have a velocity resolution 317 of 0.4 kph and a velocity accuracy 318 of 0.2 kph.

For example, the second mode 301 may have an angle resolution 319 including an azimuth angle of 2.8 deg or less and an elevation angle of 5.6 deg, an angle accuracy 320 of 0.5 deg and a cycle time of 67 ms. Here, the cycle time may refer to the second cycle time 321 when the second mode 301 is activated.

Referring to FIG. 1 again, the transceiver 110 may receive a radar signal reflected from the object.

When the first mode is activated, the processing unit 120 may detect the object based on the reflected radar signal. For example, when the first mode is activated, the processing unit 120 may detect an object related to a nearby vehicle, obstacle or person located in the vicinity of the vehicle based on the reflected radar signal. Here, the processing unit 120 may detect the object by using a conventional signal processing method.

For example, the detected object may be assumed as a nearby vehicle. When the first mode is activated, the processing unit 120 may tracks the detected object. For example, by tracking the nearby vehicle, the processing unit 120 may determine the nearby vehicle's current position, driving direction and the like.

Then, when it is determined that the object has entered into the short distance range, the processing unit 120 may activate the second mode. Otherwise, when the object is expected to enter into the short distance range based on the object's speed and position, the relative speed between the object and the vehicle and the like, the processing unit 120 may activate the second mode.

The first cycle time and the second cycle time will be described with reference to FIG. 4.

Figure 4:
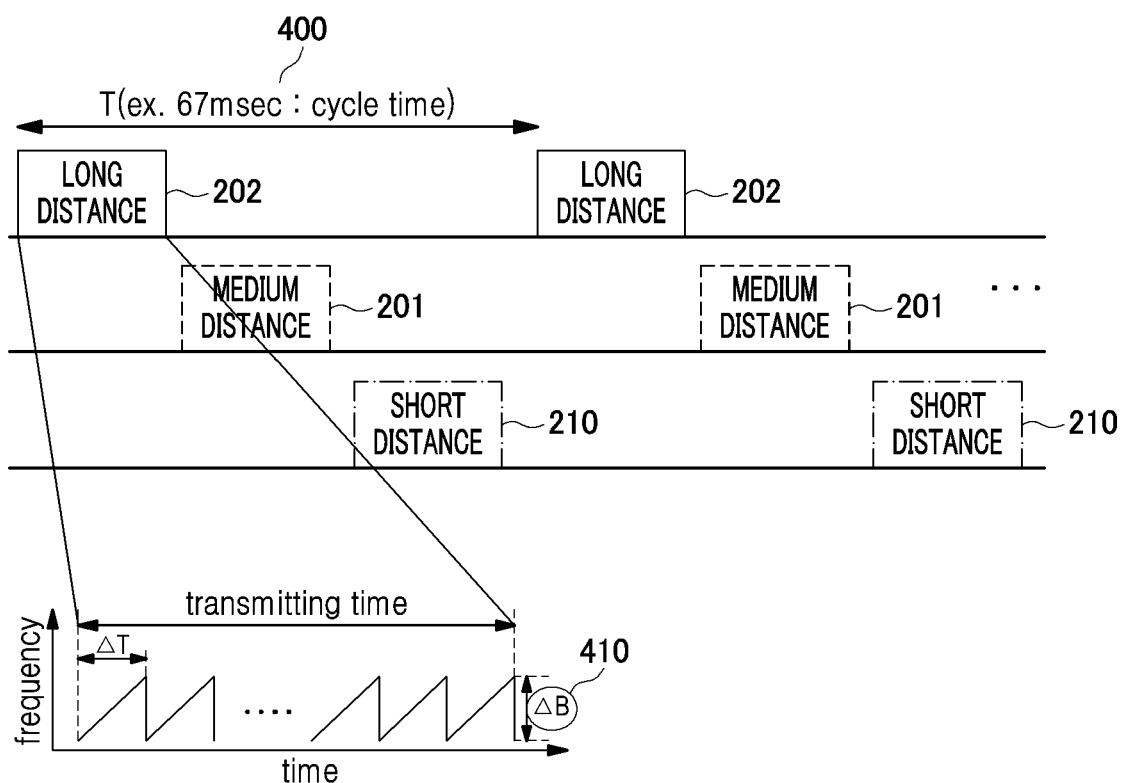
FIG. 4 is an example depiction to explain a process of operating in the first mode and the second mode during a second cycle time when the second mode is activated in accordance with an embodiment of the present disclosure.

FIG. 4 is an example depiction to explain a process of operating in the first mode and the second mode during a second cycle time when the second mode is activated in accordance with an embodiment of the present disclosure.

Although not illustrated in FIG. 4, the object detection radar apparatus 100 may transmit radar signals alternately to the long distance range 202 and the medium distance range 201 at an interval of 50 ms which is the first cycle time in the first mode (medium distance mode and long distance mode) before the second mode is activated.

Then, when it is determined that the object has entered into the short distance range or the object is expected to enter into the short distance range, the processing unit 120 of the object detection radar apparatus 100 may activate the second mode.

As illustrated in FIG. 4, when the second mode is activated, the object detection radar apparatus 100 may alternately perform the three modes including two modes of the first mode (the medium distance mode and the long distance mode) and the second mode. For example, radar signals corresponding to the long distance range 202, the medium distance range 201 and the short distance range 210 may be transmitted alternately at an interval of 67 ms which is the second cycle time 400. Here, when the second mode is activated, a bandwidth 410 of a radar signal may be 200 MHz for the long distance range, 500 MHz for the medium distance range and 3 GHz for the second mode. The bandwidths of the radar signals for the medium and long distance range of the first mode and for the second mode may be different from one another.

Referring to FIG. 1 again, when the second mode is activated, the processing unit 120 may recognize the object based on the reflected radar signal. The process of recognizing the object when the second mode is activated will be described in detail with reference to FIG. 5.

Figure 5:
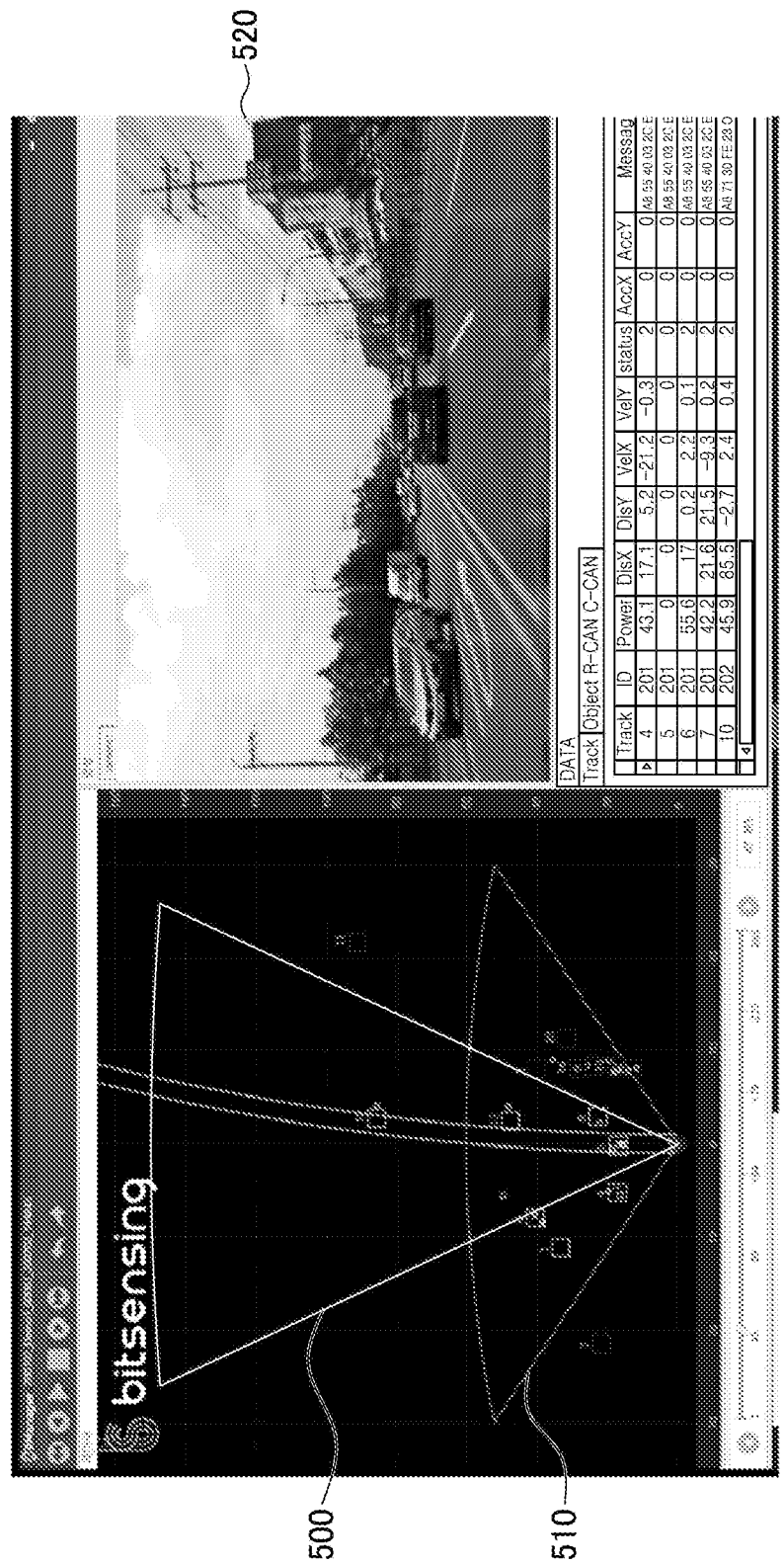
FIG. 5 is an example depiction to explain a process of recognizing an object by the object detection radar apparatus in accordance with an embodiment of the present disclosure.

FIG. 5 is an example depiction to explain the process of recognizing the object by the object detection radar apparatus in accordance with an embodiment of the present disclosure. Referring to FIG. 5, when the first mode is activated, the processing unit 120 may transmit a radar signal to a medium and long distance range 500. Here, when the first mode is activated, the processing unit 120 may allow a radar signal to be transmitted to the medium and long distance range corresponding to the first mode based on about 50 ms which is the first cycle time.

When the first mode is activated, the processing unit 120 may detect an object based on a reflected radar signal.

Then, when it is determined that the object has entered into the short distance range or the object is expected to enter into the short distance range, the processing unit 120 may activate the second mode.

The processing unit 120 may transmit a radar signal to a short distance range 510 corresponding to the second mode. Here, when the second mode is activated, the processing unit 120 may transmit radar signals alternately to the medium and long distance modes included in the first mode and the short distance mode included in the second mode at an interval of about 67 ms which is the second cycle time.

When the second mode is activated, the processing unit 120 may recognize the object based on a reflected radar signal. Here, the processing unit 120 may recognize the object by performing spatial imaging 520.

When the second mode is activated, the processing unit 120 may classify the kind of the recognized object. For example, when the second mode is activated, the processing unit 120 may classify the recognized object as "compact vehicle: OO Motor Company/XX Model" or "SUV: AA Motor Company/BB Model".

The processing unit 120 may classify the recognized object by using a trained deep-learning model based on heterogeneous sensors. Here, the heterogeneous sensors may include, for example, a radar sensor, a camera, an ultrasonic sensor, a lidar sensor and the like, and a deep-learning model for classifying a specific object may be trained based on sensing data from each sensor.

Referring to FIG. 1 again, the autonomous driving unit 130 may enable a vehicle to perform autonomous driving based on a result value of the recognized object. For example, the autonomous driving unit 130 may perform autonomous driving in consideration of a driving direction of the vehicle, such as forward, toward the left or toward the right, based on a result value of the recognized object. As another example, the autonomous driving unit 130 may increase the driving speed of the vehicle when no object is recognized in the vicinity of the vehicle and decrease the driving speed of the vehicle when any object is recognized in the vicinity of the vehicle based on a result value of the recognized object. Therefore, according to the present disclosure, it is possible to provide a radar-based autonomous driving service by separately detecting and recognizing an object through the first mode and the second mode.

FIG. 6 is a flowchart showing a method for detecting an object by the object detection radar apparatus in accordance with an embodiment of the present disclosure. The method for detecting an object by the object detection radar apparatus 100 illustrated in FIG. 6 includes the processes time-sequentially performed by the object detection radar apparatus 100 according to the embodiment illustrated in FIG. 1 to FIG. 5. Therefore, descriptions of the processes performed by the object detection radar apparatus 100 may also be applied to the method for detecting an object by the object detection radar apparatus 100, even though they are omitted hereinafter.

In a process 5610, the object detection radar apparatus 100 may transmit a radar signal to the outside of a vehicle based on a first mode or a second mode different from each other in terms of detection range.

In a process 5620, the object detection radar apparatus 100 may receive a radar signal reflected from an object.

In a process 5630, when the first mode is activated, the object detection radar apparatus 100 may detect the object based on the reflected radar signal.

In a process 5640, when the second mode is activated, the object detection radar apparatus 100 may recognize the object based on the reflected radar signal.

As another example, if an object enters from the outside into a long distance range of a first mode in which the object can be detected by the object detection radar apparatus 100, the object detection radar apparatus 100 may transmit a radar signal based on a long distance mode included in the first mode. Then, the object detection radar apparatus 100 may receive a radar signal reflected from the object located within the long distance range corresponding to the long distance mode and detect the object located within the long distance range based on the reflected radar signal.

If the object moves from the long distance range of the first mode to a medium distance range of the first mode in which the object can be detected by the object detection radar apparatus 100 as the object gets closer to the object detection radar apparatus 100, the object detection radar apparatus 100 may transmit a radar signal based on a medium distance mode of the first mode. Then, the object detection radar apparatus 100 may receive a radar signal reflected from the object located within the medium distance range corresponding to the medium distance mode and detect the object located within the medium distance range based on the reflected radar signal.

If the object moves from the medium distance range of the first mode to a short distance range of a second mode in which the object can be detected by the object detection radar apparatus 100 as the object gets closer to the object detection radar apparatus 100, the object detection radar apparatus 100 may transmit a radar signal based on the second mode. Then, the object detection radar apparatus 100 may receive a radar signal reflected from the object located within the short distance range corresponding to the second mode and recognize the object located within the short distance range based on the reflected radar signal.

That is, according to the present disclosure, the first mode and the second mode can be performed to gradually detect and recognize an object as the object gets closer to a vehicle.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. An object detection radar apparatus that is installed in a vehicle and configured to detect an object, comprising:
    a transceiver configured to:
    transmit a radar signal to an outside of the vehicle based on a first mode or a second mode different from each other in terms of detection range, and
    receive a radar signal reflected from the object; and
    a processing unit configured to:
    detect the object based on the reflected radar signal when the first mode is activated, and
    recognize the object based on the reflected radar signal when the second mode is activated,
    wherein the first mode corresponds to a medium and long distance range, and
    the second mode corresponds to a short distance range shorter than the medium and long distance range.

2. The object detection radar apparatus of claim 1, wherein when it is determined that the object has entered into the short distance range, the processing unit activates the second mode.

3. The object detection radar apparatus of claim 2, wherein before the second mode is activated, the first mode is performed according to a first cycle time, and when the second mode is activated, the first mode and the second mode are performed according to a second cycle time different from the first cycle time.

4. The object detection radar apparatus of claim 3, wherein the first cycle time is shorter than the second cycle time.

5. The object detection radar apparatus of claim 1, wherein if the object is expected to enter into the short distance range, the processing unit activates the second mode.

6. The object detection radar apparatus of claim 1, wherein when the first mode is activated, the processing unit tracks the detected object.

7. The object detection radar apparatus of claim 1, wherein when the second mode is activated, the processing unit classifies the recognized object.

8. The object detection radar apparatus of claim 7, wherein the processing unit classifies the recognized object by using a trained deep-learning model based on heterogeneous sensors.

9. The object detection radar apparatus of claim 8, wherein the heterogeneous sensors include at least one of a camera, a lidar sensor and an ultrasonic sensor.

10. The object detection radar apparatus of claim 1, wherein the first mode includes a medium distance mode and a long distance mode, and
    a bandwidth of a radar signal transmitted in the medium distance mode, a bandwidth of a radar signal transmitted in the long distance mode and a bandwidth of a radar signal transmitted in the second mode are different from one another.

11. The object detection radar apparatus of claim 10, wherein when the second mode is activated, the medium distance mode, the long distance mode and the second mode are alternately performed.

12. The object detection radar apparatus of claim 1, further comprising:
    an autonomous driving unit configured to enable the vehicle to perform autonomous driving based on a result value of the recognized object.

13. An object detection method for detecting an object by an object detection radar apparatus, comprising:
    transmitting a radar signal to the outside of a vehicle based on a first mode or a second mode different from each other in terms of detection range;
    receiving a radar signal reflected from the object;
    detecting the object based on the reflected radar signal when the first mode is activated; and
    recognizing the object based on the reflected radar signal when the second mode is activated,
    wherein the first mode corresponds to a medium and long distance range, and
    the second mode corresponds to a short distance range shorter than the medium and long distance range.

14. The method of claim 13,
    wherein in the detecting of the object,
    the object that has entered into a medium and long distance range corresponding to the first mode is detected based on the radar signal transmitted to the medium and long distance range.

15. The method of claim 14,
    wherein in the recognizing of the object,
    the object that has entered into a short distance range corresponding to the second mode and shorter than the medium and long distance range is recognized based on the radar signal transmitted to the short distance range.

16. The method of claim 15, further comprising:
    activating the second mode when it is determined that the object has entered into the short distance range.

17. The method of claim 13, wherein the transmitting of the radar signal includes:
transmitting the radar signal based on the first mode that is performed according to a first cycle time before the second mode is activated.

18. The method of claim 13, wherein the transmitting of the radar signal includes:
transmitting the radar signal based on the first mode and the second mode that are performed according to a second cycle time different from a first cycle time when the second mode is activated.

19. The method of claim 13, further comprising:
transmitting the radar signal based on a long distance mode included in the first mode;
receiving a radar signal reflected from the object located within a long distance range corresponding to the long distance mode;
detecting the object located within the long distance range based on the reflected radar signal;
transmitting the radar signal based on a medium distance mode included in the first mode;
receiving a radar signal reflected from the object located within a medium distance range corresponding to the medium distance mode;
detecting the object located within the medium distance range based on the reflected radar signal;
transmitting the radar signal based on the second mode;
receiving a radar signal reflected from the object located within a short distance range corresponding to the second mode; and
recognizing the object located within the short distance range based on the reflected radar signal.

* * * * *